(12) United States Patent
Golecki et al.

(10) Patent No.: US 6,913,821 B2
(45) Date of Patent: Jul. 5, 2005

(54) FLUIDIZING OXIDATION PROTECTION SYSTEMS

(75) Inventors: Ilan Golecki, Parisppany, NJ (US); Terence B. Walker, South Bend, IN (US); Laurie A. Booker, South Bend, IN (US)

(73) Assignee: Honeywell International Inc., Morristown, NJ (US)

(*) Notice: Subject to any disclaimer, the term of this patent is extended or adjusted under 35 U.S.C. 154(b) by 55 days.

(21) Appl. No.: 10/622,257

(22) Filed: Jul. 18, 2003

(65) Prior Publication Data

US 2004/0038043 A1 Feb. 26, 2004

Related U.S. Application Data

(63) Continuation-in-part of application No. 09/518,013, filed on Mar. 3, 2000, now Pat. No. 6,737,120
(60) Provisional application No. 60/123,018, filed on Mar. 4, 1999.

(51) Int. Cl.[7] .............................. B32B 9/00; B05D 3/02
(52) U.S. Cl. ....................... 428/367; 428/408; 428/334; 428/337; 428/704; 427/228; 427/422; 427/424; 427/427; 427/430.1; 427/443.2
(58) Field of Search ................................ 428/334, 337, 428/704, 367, 408, 332, 426, 216, 698; 427/424, 430.1, 443.2, 427, 429, 228

(56) References Cited

U.S. PATENT DOCUMENTS

| | | | |
|---|---|---|---|
| 4,036,655 A | * 7/1977 | Yamada et al. | ............. 106/611 |
| 4,645,700 A | 2/1987 | Matsuhisa et al. | |
| 4,668,579 A | * 5/1987 | Strangman et al. | ......... 428/367 |
| 4,791,076 A | 12/1988 | Leggett et al. | |
| 4,837,073 A | * 6/1989 | McAllister et al. | ......... 428/212 |
| 4,892,790 A | 1/1990 | Gray | |
| 5,169,718 A | 12/1992 | Miura et al. | |
| 5,286,545 A | * 2/1994 | Simmons, Jr. | ............. 428/192 |
| 5,298,311 A | 3/1994 | Bentson et al. | |

(Continued)

FOREIGN PATENT DOCUMENTS

| | | |
|---|---|---|
| EP | 0 482 782 A1 | 4/1992 |
| WO | WO 00/51950 | 9/2000 |

OTHER PUBLICATIONS

Orlov et al., Abstract of WO93/10057, "Method for Obtaining Protective Coating on Carbon Article", May 27, 1993.
Orlov et al., Abstract of WO93/10058, "Composition for Obtaining Protective Antioxidation Coating on Carbon Article", May 27, 1993.

*Primary Examiner*—Rena Dye
*Assistant Examiner*—Jill M. Gray
(74) *Attorney, Agent, or Firm*—Larry J. Palguta

(57) ABSTRACT

Carbon composite components (1, 11, 22, 30), which may be aircraft brake discs, heat exchanger cores, and so on, are covered by protective coating 32. Component (1, 11, 22, 30) is immersed in liquid bath precursor of fluidized glass (step 55). After immersion step, glass-coated component (1, 11, 22, 30) is removed and annealed. Heat treatment gradually increases temperature to 250–350° C. at the rate of 1–2° C. per minute (step 60). Heat treatment is followed by soak at temperature of 250–350° C. for 1–10 hours (step 65). Temperature is then increased to 550–650° C. (step 70). Temperature is maintained at 550–650° C. for 1–10 hours (step 75). After completion of second prolonged heat treatment, the component is cooled until reaching room temperature (step 80). Upon completion of the annealing step, the fluidized glass coating converts to solid glass coating (32) enveloping and forming a protective barrier against undesirable oxidation of the C—C component (1, 11, 22, 30). For application to thin-gauge composites, the glass precursor components contain 20–60 weight-% water, 25–50 weight-% phosphoric acid, 2–20 weight-% alkali metal hydroxide, 1–10 weight-% manganese phosphate, 1–10 weight-% boron nitride, 0–5 weight-% elemental boron, and 10–28 weight-% boron carbide.

25 Claims, 3 Drawing Sheets

U.S. PATENT DOCUMENTS

| | | | |
|---|---|---|---|
| 5,330,838 A | * 7/1994 | Dyer et al. | 428/408 |
| 5,360,638 A | 11/1994 | Lequertier | |
| 5,362,567 A | 11/1994 | Washburn et al. | |
| 5,368,938 A | 11/1994 | Holzl et al. | |
| 5,520,976 A | 5/1996 | Giannetti et al. | |
| 5,599,624 A | 2/1997 | Prochazka | |
| 5,626,188 A | 5/1997 | Dewar et al. | |
| 5,628,363 A | 5/1997 | Dewar et al. | |
| 5,686,144 A | * 11/1997 | Thebault et al. | 427/282 |
| 5,714,244 A | 2/1998 | Delaval et al. | |
| 5,725,955 A | 3/1998 | Tawil et al. | |
| 5,736,232 A | 4/1998 | Shih et al. | |
| 5,759,622 A | * 6/1998 | Stover | 427/249.15 |
| 5,759,688 A | 6/1998 | Lee et al. | |
| 5,843,526 A | * 12/1998 | Lukacs III et al. | 427/228 |
| 5,845,399 A | 12/1998 | Dewar et al. | |
| 5,853,821 A | 12/1998 | Balhadere et al. | |
| 5,876,850 A | 3/1999 | Skowronski et al. | |
| 6,013,322 A | 1/2000 | Barsoum et al. | |
| 6,124,028 A | 9/2000 | Nagle et al. | |
| 6,737,120 B1 | * 5/2004 | Golecki | 427/8 |
| 2001/0047862 A1 | 12/2001 | Anderson et al. | |
| 2004/0020728 A1 | * 2/2004 | Koucouthakis et al. | 188/71.1 |
| 2004/0038032 A1 | * 2/2004 | Walker et al. | 428/408 |
| 2004/0038043 A1 | * 2/2004 | Golecki et al. | 428/426 |
| 2004/0129510 A1 | * 7/2004 | Koucouthakis et al. | 188/71.1 |

* cited by examiner

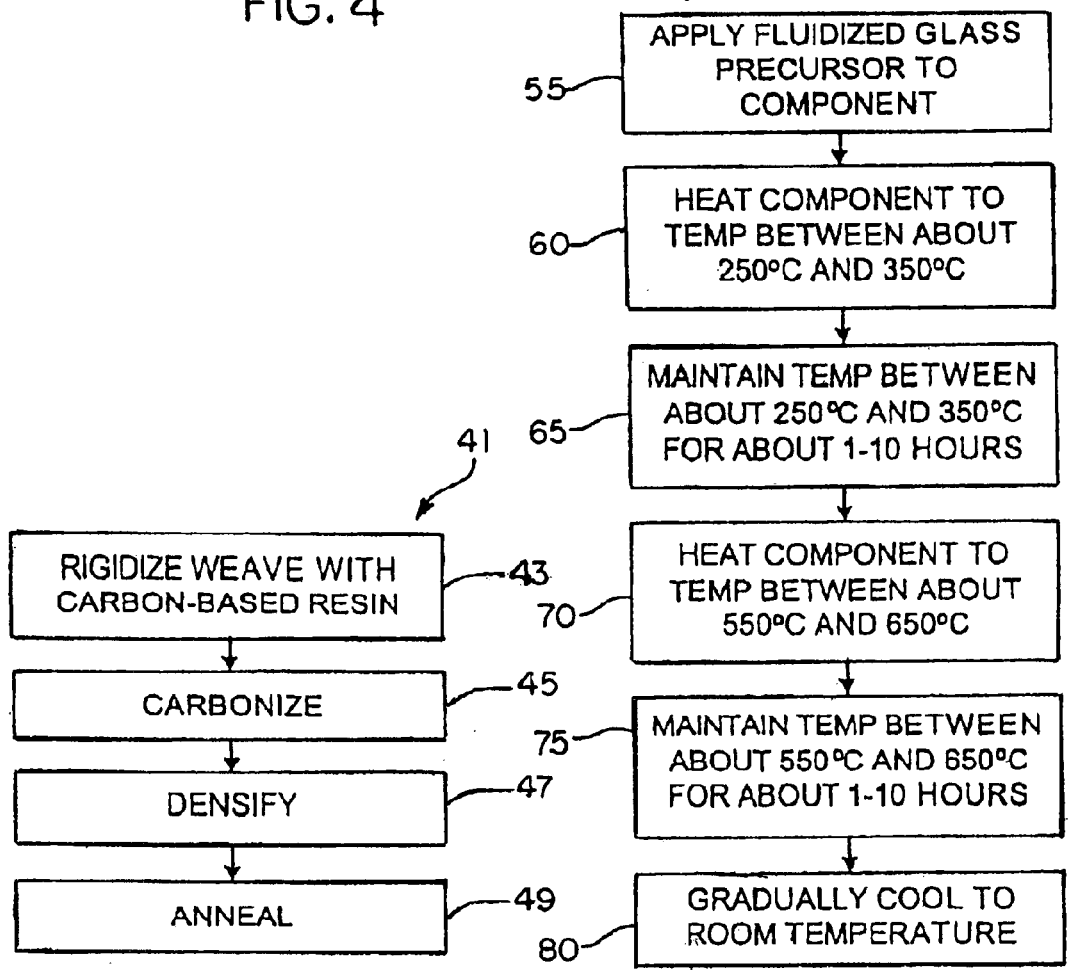

FLUIDIZING OXIDATION PROTECTION SYSTEMS

This is a continuation-in-part of copending U.S. patent application Ser. No. 09/518,013 filed Mar. 3, 2000 now U.S. Pat. No. 6,737,120 which claims priority based upon U.S. Provisional Patent Application No. 60/123,018, filed Mar. 4, 1999.

This invention was made with Government support under Contract F33615-99-C-5009 awarded by the United States Air Force. The Government has certain rights in this invention.

FIELD OF THE INVENTION

This invention relates generally to carbon fiber and carbon matrix composites such as carbon-carbon ("C—C") composites. Such composites may take the shape of aircraft brake discs, typically having thicknesses of 0.5 to 1.5 inches. Thin-gauge embodiments of such composites are particularly useful in high temperature applications, including as components in aerospace heat exchangers. This invention provides improved borophosphate multi-phase glass-ceramic coatings that protect carbon-carbon and similar materials and articles from oxidation at temperatures ranging from room temperature to about 900° C. One embodiment of the present invention protects carbon-carbon aircraft brake composites from oxidation at high temperatures (about 900° C.).

BACKGROUND OF THE INVENTION

Carbon fiber and C—C composites possess a combination of high strength, high fracture toughness, low density, very high thermal conductivity, and high electrical conductivity. The mechanical strength of carbon fiber and C—C composites actually increases as their operating temperature increases, in sharp contrast to most metals and metallic alloys that become softer and weaker as the temperature increases. This combination of attributes makes carbon fiber and/or C—C composites good candidates for many high temperature applications, such as components used in aerospace heat exchangers and aircraft brake materials.

However, the carbon in carbon fiber and C—C composites tends to oxidize when exposed to air or other oxidizing environments when the temperature exceeds approximately 300° C. When the carbon oxidizes, it loses mass, due to the formation of $CO_2$ and CO gases as oxidation products. This loss in mass leads directly to loss of mechanical strength, as well as loss of integrity, functionality, and ultimately to the failure of the component.

For relatively thick—for instance 1 inch (25 mm) thick—C—C articles, a mass loss of approximately 10–40%, although it is generally not desirable, may sometimes be tolerated before functionality is substantially degraded. In contrast, however, for very thin—for instance single-ply 10–20 mil (0.2–0.5 mm) thick—C—C articles, a five to twenty times smaller carbon mass loss of about 2% may result in an undesirably high 50% loss in tensile strength. Thus, protecting very thin C—C articles from oxidation is quite challenging, in particular because methods that are effective for much thicker articles may not be obviously applicable and/or effective in such very thin articles.

In order to protect the C—C components from oxidation when they are subjected to repeated or sustained high temperatures, barrier coatings are generally applied to the components. Many known barrier coatings, however, tend to develop micro-cracks over time. These micro-cracks allow oxidizing agents to penetrate the coating and reach the underlying C—C composite, resulting in loss of mass and ultimately in component failure.

Known barrier coatings applied to carbon fiber or C—C composite components have failed to protect the carbon component substrate against oxidation due primarily to the difference in thermal expansion coefficients between the specific coating and the C—C component substrate. For example, in a component made from a two-dimensional woven carbon substrate, the component exhibits non-isotropic coefficients of expansion. In an in-plane direction, the thermal expansion coefficient is about −1 ppm/° C. between room temperature and approximately 300° C. and the thermal expansion coefficient increases to about 1 ppm/° C. up to approximately 600° C. In a through-plane direction and where no carbon fibers are present in a 2-dimensional woven component, the coefficient is about 2–4 ppm/° C.

When a barrier or protective coating on a C—C substrate has a thermal expansion coefficient of 3–5 ppm/° C., the coating and substrate portions will expand at differing rates when subjected to elevated temperatures. Micro-cracks will develop over time in the coating, eventually allowing air to penetrate and oxidize the C—C substrate. The result will be a loss of mechanical strength, as well as loss of integrity, functionality, and ultimately failure of the component.

U.S. Pat. No. 6,737,120 B1 relates to carbon fiber or C—C composites useful in a variety of applications. This patent teaches methods of protecting such composites against oxidation by coating them with fluidized-glass type mixtures. The fluidized-glass mixtures are maintained as liquid precursors and are applied to components formed of carbon fiber or C—C composites. Once coated with the precursors, the coated C—C components are heat-treated or annealed for one or more cycles through a series of gradual heating and cooling steps. This process creates solid glass coatings having thicknesses of about 1–10 mils. The thicknesses of the solid glass coatings may be varied by varying the composition of the fluidized glass precursor mixtures, the number of application cycles, and/or the annealing parameters.

U.S. Pat. 6,737,120 B1 teaches that the fluidized glass materials may comprise such materials as borate glasses (boron oxides), phosphate glasses (phosphorus oxides), silicate glasses (silicon oxides), and plumbate glasses (lead oxides). These glasses may include phosphates of manganese, nickel, vanadium, aluminum, and zinc, and/or alkaline and alkaline earth metals such as lithium, sodium, potassium, rubidium, magnesium, and calcium and their oxides, and elemental boron and/or boron compounds such as BN, $B_4C$, $B_2O_3$, and $H_3BO_3$. By way of example, the patent discloses a boron-containing liquid fluidized glass precursor mixture that includes 29 weight-% phosphoric acid, 2 weight-% manganese phosphate, 3 weight-% potassium hydroxide, 1 weight-% boron nitride, 10 weight-% boron, and 55 weight-% water.

It has been found that the problem of protecting C—C components from oxidizing when subjected to operating temperatures up to about 1100° C. is particularly troublesome when the carbon component is as thin as 3 to 30 mil gauge, and/or complex in shape. Such components may range from flat sheets to fine-dimensioned corrugated fins for use in heat exchanger assemblies. A need exists therefore to prevent oxidation of such thin-gauge carbon fiber or C—C components over their life cycles.

SUMMARY OF THE INVENTION

This need may be met by the improved coatings and methods of application carried out in accordance with the present invention. In accordance with this invention, a specific type of fluidized-glass type mixture that is maintained as a liquid precursor at a temperature of between about 20–90° C. is applied to a component formed of carbon fiber or C—C composite. Once coated with the precursor, the coated C—C component is heat-treated or annealed for at least one cycle through a series of gradual heating and cooling steps. This creates a solid glass coating having a thickness in the range of approximately 1–10 mils. The thickness may be controlled by the composition of the fluidized glass precursor mixture, the number of application cycles, and the annealing parameters.

The present invention provides a method of protecting thin-gauge carbon fiber or carbon-carbon (C—C) composite components against oxidation. This method of the invention includes a number of steps. One step involves applying a coating of fluidized borophosphate glass precursor over the thin-gauge component to be protected by immersing the C—C component in a bath containing glass precursor components that include at least 2 weight-% boron carbide and no more than 13 weight-% elemental boron, preferredly at least 10 weight-% boron carbide and no more than 5 weight-% elemental boron. This step may be accomplished by rotating either the C—C component or the bath relative to one another when the component is immersed, preferably for more than one minute, in the fluidized glass precursor to completely and uniformly cover the component with the fluidized glass precursor. A further step involves gradually heating the precursor-coated component to a temperature range at which glass transition temperature of the glass will be thermally matched to the oxidation temperature range of the carbon in the C—C component. This step may be accomplished, for instance, by heating the glass precursor coated component at a rate of about 1–2° C. per minute to a temperature of between about 250-350° C. and then maintaining the temperature at about 250–350° C. for a period of between 1–10 hours. A still further step involves continuing to heat the glass-coated component, for instance at a temperature of between about 550–650° C. for a period of between 1–10 hours, to facilitate desired chemical reactions in the glass and glass precursor, as well as stress reduction. Finally, the glass-coated component is gradually cooled to envelop the C—C component in a solid glass coating.

The glass precursor components used in this method can comprise 20–60 weight-% water, 25–50 weight-% phosphoric acid, 2–20 weight-% alkali metal hydroxide, 1–10 weight-% manganese phosphate, 0–10 weight-% boron nitride, preferably 1–10 weight-% boron nitride, 0–13 weight-% elemental boron, preferably 0–5 weight-% elemental boron, and 2–50 weight-% boron carbide, preferably 10–28 weight-% boron carbide.

Similarly, considering a thin-gauge carbon fiber or carbon-carbon (C—C) composite component having a thickness of for instance about 3–30 mils, said thin-gauge composite being configured for example as a heat exchanger core, this invention provides a method of protecting the component against oxidation. This protective method includes the steps of: preparing a liquid precursor including phosphoric acid, manganese phosphate, potassium hydroxide, boron nitride, boron carbide, and water; maintaining the precursor at a temperature in the range of between about 20–90° C.; applying a coating of the liquid precursor to an outer surface of the component; and annealing the coated component at a temperature in the range of about 250–650° C., thereby creating a solid glass protective coating of about 1–10 mils thickness around the component for protecting the component from oxidizing species.

Still another method embodiment of the present invention includes the steps of: forming thin-gauge two-dimensional woven fabric panels; rigidizing the panels with a small percentage of carbon-containing resin; carbonizing the panels at a temperature in the range of about 800–1000° C.; densifying by chemical vapor deposition; annealing the component at a temperature in the range of about 2200–2600° C.; and applying a coating of fluidized glass precursor over the component, by immersing the C—C component in a bath containing glass precursor components including at least 2 weight-%, preferably at least 10 weight-%, boron carbide and no more than 13 weight-%, preferably no more than 5 weight-%, elemental boron, to cover the C—C component, thereby protecting the component against oxidizing species.

This invention also provides articles of manufacture comprising thin-gauge components, made of carbon fiber or carbon-carbon (C—C) composite having a thickness of about 3–30 mils, and which may be of complex shape, annealed at temperatures in the range of about 2200–2600° C. The articles of manufacture of this invention also comprise glass coatings of about 1–10 mil, made with mixtures containing 20–60 weight-% water, 25–50 weight-% phosphoric acid, 2–20 weight-% alkali metal hydroxide, 1–10 weight-% manganese phosphate, 0–10 (preferably 1–10) weight-% boron nitride, 0–13 (preferably 0–5) weight-% elemental boron, and 2–50 (preferably 10–28) weight-% boron carbide, annealed to these components at temperatures in the range of about 250–650° C. In these articles, a glass coating covers and protects the component against oxidizing species when the article is subjected to temperatures of up to about 800° C.

A further embodiment of the present invention relates to thicker carbon composites, configured for instance as aircraft landing system brake discs. Articles in accordance with this aspect of the invention include components, made of carbon fiber or carbon-carbon (C—C) composite having a thickness of about 0.5 to 1.5 inches, annealed at temperatures in the range of about 2200–2600° C., and glass coatings of about 1–10 mil in thickness, made with mixtures containing 20–60 weight-% water, 25–50 weight-% phosphoric acid, 2–20 weight-% alkali metal hydroxide, 1–10 weight-% manganese phosphate, 0–10 weight-% boron nitride, 0–13 weight-% elemental boron, and 2–50 weight-% boron carbide. These glass coatings cover and protect the component against oxidizing species when it is subjected to temperatures of up to about 900° C.

This invention provides a related method of protecting a carbon fiber or carbon-carbon (C—C) composite component against high temperature oxidation, for instance oxidation at 1600° F. This method comprising the steps of: applying a coating of fluidized borophosphate glass precursor over the component by immersing the C—C component in a bath containing glass precursor components including 25–50 weight-% phosphoric acid, 1–10 weight-% manganese phosphate, 2–20 weight-% potassium hydroxide, 1–10 weight-% boron nitride, 0–30 weight-% boron carbide, and 20–60 weight-% water; gradually heating the precursor-coated component to a temperature range (e.g., about 20–90° C.) at which glass transition temperature of the glass will be thermally matched to the oxidation temperature range of the carbon in the C—C component; continuing to heat the glass-coated component (e.g., to about 250–650° C.) to facilitate desired chemical reactions in the glass and glass precursor, as well as stress reduction; and gradually cooling the glass-coated component to envelop said component in a solid glass coating, thereby creating a solid glass protective coating of about 1–10 mils thickness around the component for protecting the component from oxidizing species.

BRIEF DESCRIPTION OF THE DRAWINGS

Details of the present invention and attendant advantages thereof will be better understood by reference to the detailed description hereinbelow considered in connection with the accompanying illustrative, non-limiting drawings.

FIG. 4 is a schematic view of a carbon-containing or C—C substrate having a coating formed in accordance with the present invention.

FIG. 5 is a flow chart of a method of forming C—C components capable of functioning in a high temperature environment when coated.

FIG. 6 is a flow chart of a method for applying an oxidation protective fluidized coating to a C—C composite substrate in accordance with the present invention.

DETAILED DESCRIPTION OF THE INVENTION

The present invention embodies a carbon fiber or C—C composite component coated with a fluidized glass precursor coating. After the precursor is applied to the component, it is heat treated to create a solid glassy coating. After the component is cooled, a solid glass coating is present that is capable of protecting the composite component against oxidation during repeated exposures where the usable time-temperature profile covers an operating time at temperatures ranging from room temperature to a temperature of about 650–750° C.

The temperature at which a solid glass will become liquid depends upon the glass composition and processing or synthesis details. The glass may become liquid in the temperature range of between −50° C. and +1100° C., more specifically in the range between 200° C. and 850° C. and most desirably between 300° C. and 700° C. When the range at which the fluidized glass precursor becomes liquid overlaps the range at which the carbon oxidizes, the resulting glass coating is matched to protect the carbon from oxidation.

Figure 1:
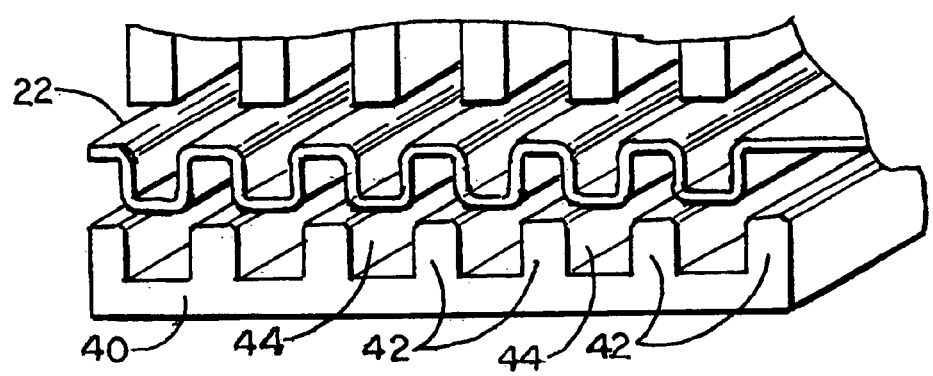
FIG. 1 illustrates a tool for forming thin woven carbon-based sheets usable as heat exchanger fins, which fins can be protected against oxidation in accordance with the present invention.
Figure 2:
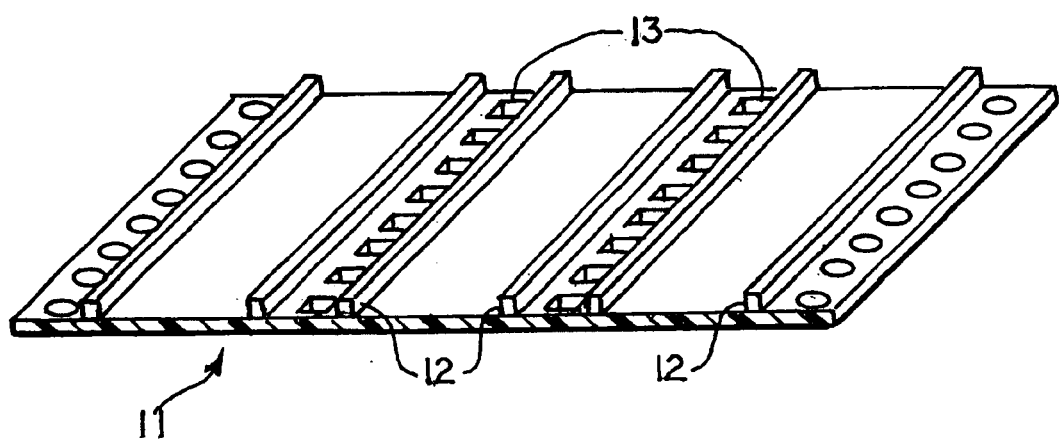
FIG. 2 is a schematic illustration of an enlarged pictorial view of a perforated ribbed sheet that has a complex shape, and which can be protected against oxidation in accordance with the present invention.

FIGS. 1 and 2—Thin-Gauge Components

Before the fluidized glass precursor is applied to the C—C composite component, the component is fabricated in almost any desired shape. The invention is especially adaptable for thin gauge and/or complex shaped C—C components. For example, and without limitation to the actual shape of any component, a C—C composite component may take the shape of flat sheets or corrugated heat exchanger fins or similar heat exchanger components having a thickness of between 3 and 30 mils (0.07–0.75 mm).

FIGS. 1 and 2 illustrate without limiting the thin-gauge components than can be protected against oxidation in accordance with the present invention.

FIG. 1 illustrates the manufacture of a thin-gauge component, specifically, a corrugated fin sheet 22. Such fin sheets can in turn be used to manufacture a heat exchanger core, as described for instance in US published application 2001/0047862 A1, the entire disclosure of which is herein expressly incorporated by reference. A press fit tool includes a machined plate 40 having a series of articulated substantially parallel metal fingers 42 defining grooves 44 for receiving the fin weave therein. The number of grooves/fingers per inch define the fins per inch and fin height of the resulting corrugated fin structure. The woven, impregnated fin sheets 22 can be pressed into the grooves preferably using Teflon insertion strips.

FIG. 2 illustrates a thin-gauge component having a complex shape, specifically, a flat plate 11 that can be used to manufacture a heat exchanger core, as described for instance in U.S. Pat. No. 5,628,363, the entire disclosure of which is herein expressly incorporated by reference. In the heat exchanger core, a series of ribs or bars 12 separate the fin plates or sheets 11. The plates 11 are also characterized by apertures 13. This complex combination of apertures and ribs makes a component with a complex shape, which can profitably be protected by the oxidation-protective method and materials of the present invention.

Figure 3A:
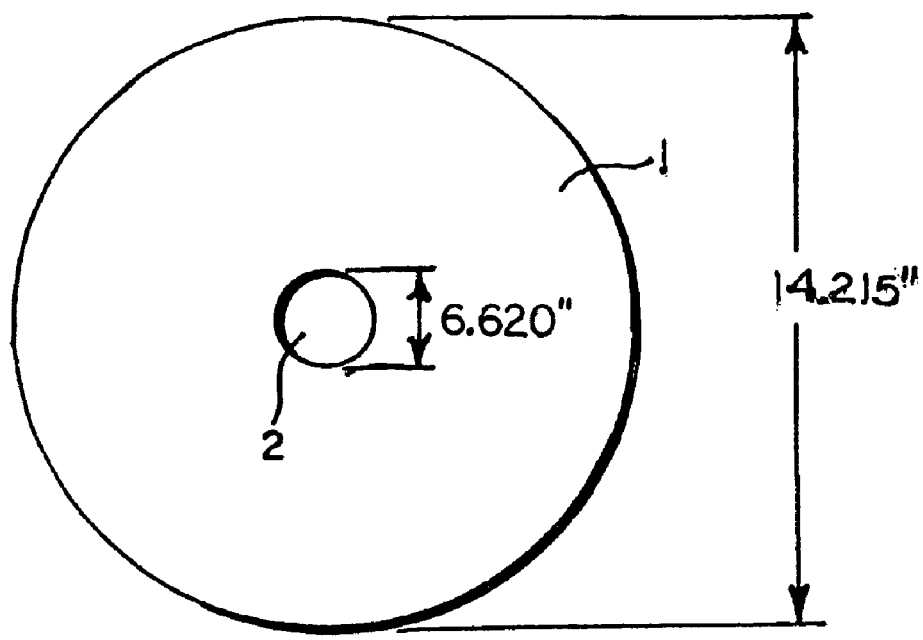
FIGS. 3A and 3B show overhead (3A) and side (3B) views of a fibrous brake disc preform that can be coated in accordance with the present invention.
Figure 3B:
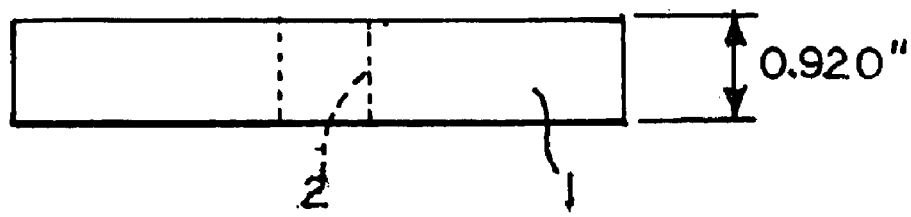

FIGS. 3A and 3B—Aircraft Brake Discs

The present invention also extends to the manufacture of brake components for aircraft landing systems. FIGS. 3A and 3B show (not to scale) a preform 1, configured as a brake disc for a jet airplane. Preform 1 has an inside diameter 2 of 6.620 inches (16.81 cm), an outside diameter of 14.215 inches (36.11 cm), and a thickness of 0.920 inches (2.34 cm). Such brake disc preforms can be protected against high temperature oxidation in accordance with the present invention, as will be apparent to those skilled in the art from the disclosure that follows.

FIGS. 4 and 5

For a better understanding of the present invention, attention is now directed to FIG. 4, wherein a carbon fiber or C—C composite component is generally illustrated at 30. The component 30 is covered by a protective coating 32. For purposes of example only, the C—C composite component 30 may be fabricated by a process set forth in a flow chart 41 of FIG. 5. The component 30 may be formed, for example, from two-dimensional woven carbon fabric panels of pitch-based Amoco P30X carbon fiber tows in a harness satin weave, pitch-based Nippon XNC25 in a plain weave, YS15 carbon fiber tows in a plain weave, or other such materials fabricated from any number of pitch-based, polyacrylonitrile-based (PAN-based), or rayon-based carbon fibers.

The tows are rigidized with a small amount (few percent range) of carbon-containing resin, such as epoxy Novolac (step 43). The material is then carbonized at a temperature in the range of 800–1000° C. (step 45) and densified by carbon CVD (step 47). The resulting material is then annealed in an inert gas at a temperature in the range of 2200–2600° C. (step 49). This process creates a C—C composite component that is adaptable for use in high temperature environments when properly protected against oxidation. It is to be understood that the oxidation protective coating of the present invention is intended to be applicable to C—C composite components regardless of how the C—C composite components are fabricated.

The C—C composite is cleaned and prepared for application of a liquid fluidized glass precursor. Surface preparation may include application of one or more conventional surfactants to facilitate application of the liquid precursor.

The composite component 30 is then immersed or bathed in the fluidized glass precursor. Alternatively, the fluidized glass precursor may be applied onto the outside surface of the C—C composite by brushing, spray atomization, or other known methods. After application of the fluidized glass precursor and further thermal processing, the composite component 30 is enveloped within a solid, multi-phase glass protective coating 32. The coating 32 comprises a glass material capable of at least some flowing with at least partial sealing of pre-existing cracks in the C—C component.

Fluidized Glass Materials

In accordance with the present invention, the fluidized glass materials are phosphate and borophosphate glasses. These glasses may include: phosphates of manganese, nickel, vanadium, aluminum, zinc, etc; and/or alkaline and/or alkaline-earth metals, such as lithium, sodium, potassium, rubidium, magnesium, or calcium, and their respective oxides. In accordance with the present invention, however, the slurries from which the glass are made must contain at least 2 weight-% boron carbide and may contain no more than 13 weight-% elemental boron. The specific ingredients of the fluidized glass coating 32 will depend on the desired properties of the glass, such as viscosity during both application and subsequent use and functional dependence of viscosity and vapor pressure as a function of temperature. Other factors include the amount of boron-containing particulates and the ratio of particulates to liquid during application.

The present inventors have discovered that a class of borophosphate glasses which includes, among others, the borophosphate glasses that are used in accordance with the present invention may be used in another oxidation protection environment. See U.S. patent application publication 2004/0038032 A1, which claims carbon fiber and C—C articles covered by specific phosphate glass undercoatings and boron-containing glass overcoatings.

The desired properties of the glass material may be tailored to the temperature range over which coating 32 protects the composite component 10 from destructive oxidation. Likewise, the thickness and number of glass coatings applied to component 30 will depend on the method of applying the coating and the intended use for the composite component 30.

FIG. 6

Referring now to FIG. 6, a flow chart 50 shows a first method of coating a C—C component 30 with the protective coating 32. The C—C component 30 is immersed or dipped in liquid bath precursor of fluidized glass for several minutes (step 55). The liquid precursor is maintained at a temperature in the range of about 20–90° C. The component 30 and/or the liquid precursor may be rotated relative to one another to improve the compositional uniformity and reduce the viscosity of the bath and to improve the wetting characteristics and uniformity of the coating. Alternatively, the component can be coated by brushing, spray atomization, or other conventional methods.

After the immersion step is completed, the glass-coated component 30 is removed and annealed or heat-treated in a non-oxidizing environment. The annealing step is preferably carried out with a relatively slow ramp-up and possibly slow ramp-down of the heating and cooling rates, respectively. For example, the ramp-up rate may be in the order of 1–2° C. per minute. The temperature time-cycle of the annealing process may vary. For example, the heat treatment may include a gradual ramp up in temperature to about 250–350° C. at the aforestated rate of 1–2° C. per minute (step 60). The heat treatment or annealing may be followed by a soak, wherein the temperature is maintained in the temperature range of 250–350° C. for approximately 1–10 hours (step 65). Upon completing the extended heating at 250–350° C., the temperature may be further increased at the same rate of about 1–2° C. until reaching a range of 550–650° C. (step 70). The temperature is then maintained in the range of 550–650° C. for another period of approximately 1–10 hours (step 75). After completing the second prolonged heat treatment for between 1–10 hours at about 550–650° C., the component may be gradually cooled at the same rate of approximately 1–2° C. per minute until reaching room temperature (step 80).

The annealing environment may include an inert flowing gas such as nitrogen or argon. Alternatively, the component 30 may be located in a vacuum chamber. In either case, upon completion of the annealing step, the fluidized glass coating is converted to a solid glass coating 32 enveloping and forming a protective barrier against undesirable oxidation of the C—C component 30.

The immersion/dipping (step 55) followed by the annealing (steps 60–80) comprise a single cycle. It may be desirable to subject the coated component 30 to more than one cycle in order to enhance the level of oxidation protection. Typically, two, three or even more cycles may be repeated. When performing multiple cycles, at least one of the intermediate cycles may only heat the coated component to a range of 250–350° C. When a lower heating level is utilized for at least one intermediate cycle, the final cycle should include heating the component to the higher temperature of between 550–650° C.

Instead of dip coating or immersing the C—C component in a bath of liquid glass precursor, the fluidized glass precursor may be brush-coated directly onto the component. Alternatively, the fluidized glass coating may be applied by gravity feed, forced convection, sol-gel, spray coating, atomizing at atmospheric or lower pressure, or applied by CVD or any other known method. The immersion may be carried out at room temperature or at an elevated temperature. Due to the fluidizing and self-healing properties of the coating, this glass coating provides protection against oxidation even where the thickness of the coating is not uniform over the entire surface of the substrate.

By way of example, the liquid fluidized glass precursor mixture may include by weight percentage: water 39%, phosphoric acid 37%, manganese phosphate 3%, potassium hydroxide 3%, boron nitride 1%, and boron carbide 17%. The resulting thickness of the coating 12 formed by such a mixture may be, after annealing, in the range of 1–10 mil (0.02–0.25 mm).

Coating Durability

In order to test the durability of glass coated C—C components of approximately 10 mil thickness to resist oxidation, sets of C—C specimens were first weighed and their dimensions measured prior to being glass coated and again after undergoing the dip coating and annealing process. The coated components were then subjected to a flowing stream of dry air in an alumina tube while being heated in a furnace having a uniform hot zone sufficiently large to encompass the components. The dry flowing air was maintained at a temperature of approximately 650° C. In this testing procedure, specimens at first exhibited slight weight gains as a function of exposure time to the flowing air at 650° C. After much longer continued exposure to the flowing 650° C. air, all of the specimens eventually showed weight loss.

Working Examples

Continuous-pitch-fiber based, two-dimensional, woven C—C specimens were coated with borophosphate-based slurries. Prior to coating with the slurries, the surfaces of the C—C samples were prepared by dipping them into surfactant, by mechanical abrasion, by exposure to electrical discharge in vacuum (plasma exposure), or by other means to render the surface more receptive and amenable to coating adhesion. After the slurry was applied onto the C—C samples by brushing or dipping, the samples were heated in an inert atmosphere of flowing nitrogen gas in a furnace at a relatively slow heating rate of about 1° C./minute to a temperature of approximately 300° C. The samples were held at that temperature for about 3–6 hours and then were further heated at about 1° C./minute to a temperature of approximately 580° C. and held at that temperature for about 3–6 hours. Thereafter, the samples were cooled to room temperature at a rate of about 1° C./minute. After this annealing procedure, a solid coating was present on the C—C samples. This coating and annealing procedure may be repeated more than once, and actually was repeated a second time in the present example.

Table 1 shows the composition (in gram-weight) of four different slurries used to test-coat carbon-carbon materials in accordance with various embodiments of the present invention.

TABLE 1

| Slurry | H₂O (deionized) | Phosphoric acid (85%) | KOH | Manganese phosphate | Boron nitride | Boron | Boron carbide |
|---|---|---|---|---|---|---|---|
| B4 | 200.0 | 188.6 | 18.0 | 14.1 | 9.2 | 63.7 | 0.0 |
| B5 | 200.0 | 188.6 | 18.0 | 14.1 | 9.2 | 101.0 | 0.0 |
| B6 | 200.0 | 188.6 | 18.0 | 14.1 | 9.2 | 33.6 | 43.0 |
| B7 | 200.0 | 188.6 | 18.0 | 14.1 | 9.2 | 0.0 | 86.0 |

In Table 1, slurry B6 contains 6.6 weight-% elemental boron and 8.5% boron carbide, while slurry B7 contains no elemental boron and 17 weight-% boron carbide. Compositions B4 and B5 are both devoid of boron carbide.

Aircraft Landing System Brake Materials

Table 2 summarizes relative weight changes (in percent) of coated C—C brake material samples after 5 hours of exposure to flowing dry air at 1600° F. (871° C.). Negative numbers signify weight loss. Positive numbers signify weight gain. Formulations B4–B7 are as described above. Coating formulation P-13K is a phosphorus-containing coating. The weight loss percentages in each case represent the average of a set of three coated CARBENIX® brake material samples.

TABLE 2

| Slurry | Coats | % weight loss (−) or gain (+) |
|---|---|---|
| B4 | 2 | −0.08 |
| B5 | 2 | +0.66 |
| 66 | 2 | +0.02 |
| B7 | 2 | −0.29 |
| P-13K | 1 | −18.7 |
| P-13K | 2 | −14.6 |

It can been seen from Table 2 that brake material samples coated in accordance with the present invention have excellent resistance to oxidative weight loss upon xposure at a high temp rature.

Thin-Gauge Composites

Table 3 summarizes relative weight changes (in percent) of borophosphate-coated, continuous-P30X-pitch-fiber, single-ply, C—C substrate sets after different times of exposure to flowing dry air at 650° C. Each set included three substrates. Negative numbers signify weight loss. Positive numbers signify weight gain. The B7 coated substrates, where the coating contained boron carbide but no boron, showed no weight loss after 100 hours of hot air flow. Also, the relative weight loss of the B7 coated substrates was the lowest among the four compositions tested after 150, 200, and 225 hours.

TABLE 3

| Slurry | Coats | 25 h | 100 h | 150 h | 200 h | 225 h |
|---|---|---|---|---|---|---|
| B4 | 2 | −2.1 | −23.6 | −31.2 | −39.4 | −43.1 |
| B5 | 2 | +3.6 | −7.3 | −19.2 | −31.6 | −36.9 |
| B6 | 2 | +0.2 | −12.2 | −21.1 | −32.2 | −36.9 |
| B7 | 2 | +1.2 | +0.7 | −2.7 | −10.4 | −14.4 |

The thin-gauge composite embodiments of the present invention contemplate slurries that contain at least 2 weight-% boron carbide and that contain no more than 13 weight-% elemental boron. Such embodiments of the present invention improve the economics of oxidation protection, because boron carbide is significantly less expensive than is elemental boron. Especially preferred embodiments of this aspect of the present invention are compositions that include at least 10 weight-% boron carbide and no more than 5 weight-% elemental boron. These especially preferred embodiments of the invention provide improved oxidation protection in addition to improved economics in the manufacture of thin-gauge C—C composites.

What is claimed is:

1. A method of protecting a carbon fiber or carbon-carbon (C—C) composite component against high temperature oxidation, said method comprising the steps of:
   applying a coating of fluidized borophosphate glass precursor over the component by immersing the component in a bath containing glass precursor components including 25–50 weight-% phosphoric acid, 1–10 weight-% manganese phosphate, 2–20 weight-% potassium hydroxide, 1–10 weight-% boron nitride, 0–30 weight-% boron carbide, and 20–60 weight-% waters;
   gradually heating the glass precursor-coated component to a temperature range at which the glass transition temperature of a glass formed from the glass precursor is thermally matched to the oxidation temperature range of the carbon in the component, thereby forming a glass-coated component;
   continuing to heat the glass-coated component to anneal the glass-coated component; and
   gradually cooling the glass-coated component, thereby enveloping said component in a solid glass coating which protects it against high temperatures oxidation.

2. The method of claim 1, wherein said component is configured as an aircraft landing system brake disc.

3. The method of claim 1, wherein said component is protected against oxidation at a temperature of about 1600° F.

4. The method of claim 1, comprising the steps of:
preparing a liquid glass precursor including 25–50 weight-% phosphoric acid, 1–10 weight-% manganese phosphate, 2–20 weight-% potassium hydroxide, 1–10 weight-% boron nitride, 0–30 weight-% boron carbide, and 20–60 weight-% water;
maintaining the precursor at a temperature in the range of between about 20–90° C.;
applying a coating of the liquid precursor to an outer surface of the component; and
annealing the coated component at a temperature in the range of about 250–650° C.,
thereby creating a solid glass protective coating of about 1–10 mils thickness around the component for protecting the component from oxidizing species.

5. An article comprising:
a component, made of carbon fiber or carbon-carbon (C—C) composite having a thickness of about 0.5 to 1.5 inches, annealed at a temperature in the range of about 2200–2600° C., and
a glass coating of about 1–10 mils, made with a mixture containing 20–60 weight-% water, 25–50 weight-% phosphoric acid, 2–20 weight-% alkali metal hydroxide, 1–10 weight-% manganese phosphate, 0–10 weight-% boron nitride, 0–13 weight-% elemental boron, and 2–50 weight-% boron carbide,
wherein said glass coating covers and protects said component against oxidizing species when the article is subjected to temperatures of up to about 900° C.

6. The article of claim 5, wherein said component is configured as an aircraft landing system brake disc.

7. A method of protecting a thin-gauge carbon fiber or carbon-carbon (C—C) composite component against oxidation, the method comprising the steps of:
applying a coating of fluidized borophosphate glass precursor over the component by immersing the component in a bath containing glass precursor components including at least 2 weight-% boron carbide and no more than 13 weight-% elemental boron;
qradually heating the glass precursor-coated component to a temperature range at which the glass transition temperature of a glass formed from the glass precursor is thermally matched to the oxidation temperature range of the carbon in the component, thereby forming a glass-coated component;
continuing to heat the glass-coated component to anneal the glass-coated component; and
gradually cooling the glass-coated component, thereby enveloping said component in a solid glass coating which protects it against high temperatures oxidation.

8. The method of claim 7, wherein said bath contains glass precursor components including at least 10 weight-% boron carbide and no more than 5 weight-% elemental boron.

9. The method of claim 7, wherein the glass precursor components comprise 20–60 weight-% water, 25–50 weight-% phosphoric acid, 2–20 weight-% alkali metal hydroxide, 1–10 weight-% manganese phosphate, 0–10 weight-% boron nitride, 0–13 weight-% elemental boron, and 2–50 weight-% boron carbide.

10. The method of claim 9, wherein the glass precursor components comprise 20–60 weight-% water, 25–50 weight-% phosphoric acid, 2–20 weight-% alkali metal hydroxide, 1–10 weight-% manganese phosphate, 1–10 weight-% boron nitride, 0–5 weight-% elemental boron, and 10–28 weight-% boron carbide.

11. The method of claim 7, wherein the coating of fluidized glass precursor is applied by rotating either the component or the bath relative to one another when the component is immersed in the fluidized glass precursor to completely and uniformly cover the component with the fluidized glass precursor.

12. The method of claim 7, wherein the component is immersed in the precursor bath for more than one minute.

13. The method of claim 7, wherein the step of heating the glass precursor coated component is conducted at a rate of about 1–2° C. per minute to a temperature of between about 250–350° C. and wherein the temperature is then maintained at about 250–350° C. for a period of between 1–10 hours.

14. The method of claim 7, wherein the step of continuing to heat the coated component is conducted at a temperature of between about 550–650° C. for a period of between 1–10 hours.

15. A method of protecting a thin-gauge carbon fiber or carbon-carbon (C—C) composite component against oxidation, the method comprising the steps of:
preparing a liquid glass precursor including 25–50 weight-% phosphoric acid, 1–10 weight-% manganese phosphate, 2–20 weight-% potassium hydroxide, 0–10 weight-% boron nitride, 2–28 weight-% boron carbide, and 20–60 weight-% water;
maintaining the liquid glass precursor at a temperature in the range of between about 20–90° C.;
applying a coating of the liquid glass precursor to an outer surface of the component; and
annealing the coated component at a temperature in the range of about 250–650° C.,
thereby creating a solid glass protective coating of about 1–10 mils thickness around the component for protecting the component from oxidizing species.

16. The method of claim 15, wherein the liquid precursor components comprise 20–60 weight-% water, 25–50 weight-% phosphoric acid, 2–20 weight-% potassium hydroxide, 1–10 weight-% manganese phosphate, 1–10 weight-% boron nitride, 0–5 weight-% elemental boron, and 10–28 weight-% boron carbide.

17. The method of claim 15, comprising the step of gradually heating the precursor-coated component at a rate of 1–2° C. per minute until reaching a temperature in the range of about 250–350° C. and maintaining this temperature for between 1–10 hours to further anneal the coated component.

18. The method of claim 15, comprising the step of gradually heating the precursor-coated component from a temperature in the range of about 250–350° C. to a temperature in the range of about 550–650° C. and maintaining this temperature for between 1–10 hours to further anneal the coated component.

19. The method of claim 15, wherein the component has a thickness of about 3–30 mils.

20. The method of claim 15, wherein said thin-gauge carbon fiber or carbon-carbon composite component is a heat exchanger core.

21. A method of forming an oxidation protected carbon-carbon (C—C) composite component, the method comprising:
forming thin-gauge two-dimensional woven fabric panels;
rigidizing the panels with a small percentage of carbon-containing resin;
carbonizing the panels at a temperature in the range of about 800–1000° C.;

densifying by chemical vapor deposition;

annealing the component at a temperature in the range of about 2200–2600° C.; and applying a coating of fluidized glass precursor over the component, by immersing the component in a bath containing glass precursor components including at least 2 weight-% boron carbide and no more than 13 weight-% elemental boron, to cover the component, thereby protecting the component against oxidizing species.

22. The method of claim 21, wherein said bath contains glass precursor components including at least 10 weight-% boron carbide and no more than 5 weight-% elemental boron.

23. An article comprising:

a thin-gauge component, made of carbon fiber or carbon-carbon (C—C) composite having a thickness of about 3–30 mils, annealed at a temperature in the range of about 2200–2600° C.; and a glass coating of about 1–10 mil, made with a mixture containing 20–60 weight-% water, 25–50 weight-% phosphoric acid, 2–20 weight-% alkali metal hydroxide, 1–10 weight-% manganese phosphate, 0–10 weight-% boron nitride, 0–13 weight-% elemental boron, and 2–50 weight-% boron carbide, wherein said glass coating covers and protects said component against oxidizing species when the article is subjected to temperatures of up to 800° C.

24. The article of claim 24, wherein the glass coating is annealed to the component at a temperature in the range of about 250–650° C.

25. The article of claim 23, wherein the glass components comprise 20–60 weight-% water, 25–50 weight-% phosphoric acid, 2–20 weight-% alkali metal hydroxide, 1–10 weight-% manganese phosphate, 1–10 weight-% boron nitride, 0–5 weight-% elemental boron, and 10–28 weight-% boron carbide.

* * * * *